United States Patent [19]

Heine et al.

[11] 4,327,317
[45] Apr. 27, 1982

[54] APPARATUS FOR CHARGING A RECHARGEABLE BATTERY

[75] Inventors: Helmut A. Heine; Otto H. Schmidt, both of Herrsching, Fed. Rep. of Germany

[73] Assignees: Propper Manufacturing Co., Inc., New York, N.Y.; Optotechnik GmbH & Co. KG Heine, Fed. Rep. of Germany

[21] Appl. No.: 113,680

[22] Filed: Jan. 21, 1980

[30] Foreign Application Priority Data

Jan. 25, 1979 [DE] Fed. Rep. of Germany ....... 2902894

[51] Int. Cl.³ .............................................. H02J 7/10
[52] U.S. Cl. ...................................... 320/23; 320/39; 320/48
[58] Field of Search ................................... 320/20–24, 320/39, 40, 48

[56] References Cited

U.S. PATENT DOCUMENTS

| | | | |
|---|---|---|---|
| 3,531,706 | 4/1967 | Mullersman | 320/39 X |
| 3,602,794 | 8/1971 | Westhauer | 320/39 |
| 3,659,181 | 4/1972 | Bembenek | 320/39 X |
| 3,795,818 | 3/1974 | Beaman et al. | 320/39 X |
| 3,919,618 | 11/1975 | Coleman et al. | 320/39 |

Primary Examiner—Robert J. Hickey
Attorney, Agent, or Firm—Amster, Rothstein & Engelberg

[57] ABSTRACT

An apparatus for charging a rechargeable battery including a comparator element that behaves hysteretically so that the charging apparatus upon switching to maintenance charging after a fast charge, only switches back to the fast charging when the rechargeable battery voltage has depleted sufficiently low.

1 Claim, 2 Drawing Figures

APPARATUS FOR CHARGING A RECHARGEABLE BATTERY

DESCRIPTION OF THE INVENTION

The present invention relates to an apparatus for charging a rechargeable battery in which a reference voltage and the rechargeable battery voltage are conducted onto a comparator element, having a shunt connection of one resistor and one semiconductor switch whose control-circuit is connected to the output of the comparator element.

For medical needs, there are a number of diagnostic hand instruments which are provided with miniature incandescent lamps for the iiluminating of body cavities. In recent years, nickel-cadmium rechargeable batteries have gained popularity over galvanic batteries as the energy source for operating of these lamps. The reason for this is that they have a relatively high energy storage capacity compared to their volume, and, if constantly charged to their rated capacity, a relatively long life.

Most recently, the demands on the full illuminating of the area of examination have risen, neccessitating the introduction of lamps with relatively high current consumption. Owing to the large number of patients in many private medical practices and clinics, there is often a very high frequency of use of one and the same instrument using a rechargeable battery. It follows that the energy taken from the rechargeable battery during an examination ought immediately to be replaced in the shortest time possible, preferably before the next examination.

Nickel-cadmium batteries are generally charged with a current corresponding to one-tenth of their energy/storage capacity in mAh; for instance, with 100 mA for a battery having 1 Ah. With this rated charging current, a rechargeable battery generally reaches its capacity after 14 hours. Often a so-called fast charging is also used, in which charging is accomplished with a two to fourfold rated charging current in a correspondingly shorter time. In the case of specially-suited rechargeable batteries, the so-called quick-charging can also be used, in which the charging current can run as high as ten times the rated charging current or higher.

A disadvantage in all these charging procedures, especially in the case of fast charging and, of course, in the case of quick-charging, is the necessity for limiting the duration of the charging, since rechargeable batteries can not take a strong overcharge. To this day, the state of the technology used for limiting the duration of charging remains the timer; beyond this there are recommended and known devices in which the duration of charging is interrupted upon arriving at certain values of the rechargeable battery's known properties, dependent upon degree of charge, and which can be registered by measuring techniques, preferably of the battery voltage. These devices operate basically automatically, insofar as they stop the charging by themselves and if need be switch to so-called trickle charging, which is necessary to avoid self-discharging. A comparator element serves as a control circuit. The reference voltage and the battery voltage are connected to this element, and its output controls a relay or a semiconductor switch.

Since the battery voltage drops more or less rapidly after turning off the high charging current, depending on the age and quality of the battery, this connection would function like an astable multivibrator. The known battery charging apparatus are thus constructed in such a way that after the independent switching to trickle charging, the charging process must be restarted manually if so much energy has been taken from the charged battery that it can not be replaced in time by the trickle charging. It is precisely this switching-on of the apparatus after replacing a battery or a handle supplied with one which is so often forgotten in private medical practice and in clinics, until the lack of charge in the battery is made obvious by the failure of the instrument. Then, however, a very long time is needed to charge the battery fully once again.

The present invention is therefore based on the need for a charging current which operates fully automatically, so that the battery of the instrument-handle in which it is housed, need only be placed in a charging apparatus after use in order to be charged either quickly or slowly, depending on the charge remaining in the battery, without any further steps.

This problem is solved in this invention by the fact that the comparator element behaves hysteretically, so that the charging apparatus, after switching back to trickle charging, only switches back to fast charging when the battery voltage has dropped sufficiently low after a discharge. The back-and-forth switching, like that of an astable multivibrator, is hereby prevented, obviating the need for manually switching the charging apparatus to fast charging in the case of a correspondingly diminished capacity after the discharged battery has been placed into the charging apparatus, such as is the case with the prior art apparatus.

In order to enable the construction of the comparator element with the remaining circuit of the charging apparatus as an integrated circuit in the simplest possible way, it is preferable to construct it as a positively fed back operational amplifier.

In one embodiment of the charging apparatus, the charging apparatus is provided with one or more wells into which the rechargeable battery handles are placed. Appropriately arranged contacts in the wells and on the handles assure that the battery is connected without further adjustment to the output voltage of the charging apparatus.

However, the higher the charging current chosen, the greater the difficulties become in avoiding transfer resistances of a disturbing nature between the rechargeable battery terminals and the connecting contacts of the charging apparatus. The charging current creates voltage drops in all transfer resistances, which are added to the battery voltage and lead to what is merely the impression of an elevated battery voltage. It can thereby occur that a rechargeable battery is falsely believed to be charged and the fast charging then switched off. To avoid this imperfection, the base-emitter section of a transistor with its collector attached to the charging voltage is placed into the feedback loop of the operational amplifier, as is provided in a preferred embodiment of the present invention.

With this development of the charging apparatus as in the present invention, the comparison between battery and reference voltage always is carried out when the charging current is equal or nearly equal to zero; that is, when voltage drops across the transfer resistances necessitated by the charging current are not conspicuous. This, since the charging voltage is, as usual, provided as a pulsating direct voltage.

In order to make it possible to test whether the charging apparatus is working at all, or in which stage of charge it is, a light emitting diode is connected in series with the semiconductor switch and/or the resistor lying parallel to it.

The present invention is more precisely described in the following schematic diagrams with the aid of the embodiments represented in the accompanying drawings in which.

Figure 1:
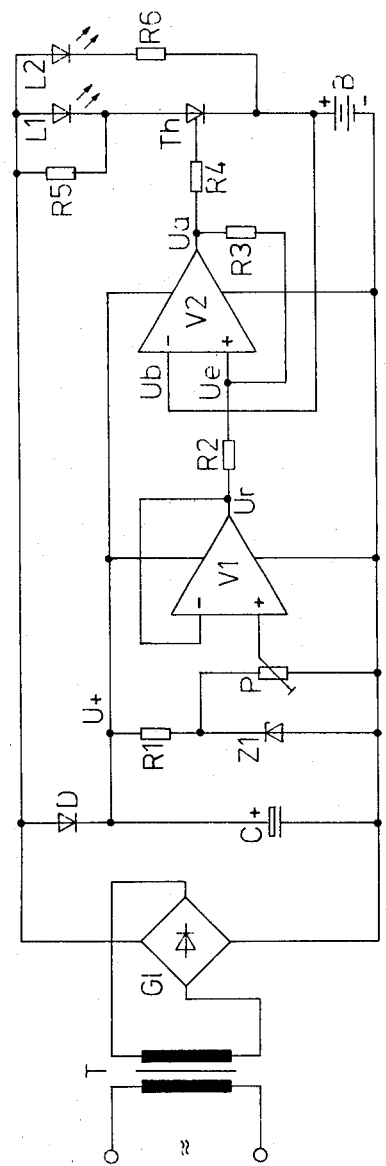
FIG. 1 is the circuit diagram of a first embodiment.

According to FIG. 1, a full wave rectifier G1 is connected to a transformer T. On the output side of the rectifier a voltage is taken pulsing between zero and a maximum value. The sequential circuit, consisting of a decoupling diode D and a condensor C, is attached to the output of the rectifier G1. At the point of conjunction between the decoupling diode D and the condenser C, a d.c. supply voltage U+ is taken, to which a resistor R1 is connected in series with a shunt connection of a Zener diode Z1 and a potentiometer P. The d.c. voltage U+ serves further as supply voltage for two operational amplifiers V1 and V2. The direct, or non-inverting input of amplifier V1 is connected to the tap of potentiometer P; its output voltage Ur is fed back to its inverting input.

The output of amplifier V1 is further connected by a resistor R2 to the direct input of amplifier V2. Its input is fed back through a resistor R3 into the direct input. The inverting input of the amplifier V2 is connected to the positive terminal of battery B in need of charging, and whose negative terminal lies on the negative side of the rectifier G1. The positive terminal of the rectifier G1 is connected by a shunt connection of a resistor R5 and a light emitting diode L1, and by a silicon controlled rectifier Th, hereby brought into sequence, to the positive terminal of battery B, which is to be charged. Parallel to this lies the series connection of a light emitting diode L2 and a resistor R6. The output of amplifier V2 is applied to the gate of the silicon controlled rectifier Th by way of resistor R4.

The Zener diode Z1 provides a stabilized d.c. voltage which can be adjusted within certain limits with the help of the potentiometer P. Amplifier V1 works as a voltage follower with low output impedance. At its output, the d.c. voltage engaged with the potentiometer P can be taken up non-reactive. The reference voltage Ue is added to amplifier V2 at its direct input, while the battery voltage Ub is fed to the inverting input of amplifier V2. As long as the battery voltage Ub is lower than the reference voltage Ue, the output voltage Ua of amplifier V2 is approximately equal to U+. The silicon controlled rectifier Th is fired, allowing the charging current to flow into the battery with every half-sinusoid by way of the shunt connection of light emitting diode L1 and resistor R5.

Resistor R5 is necessary for limiting the current through light emitting diode L1. During fast charging the output voltage Ua of amplifier V2 is continually greater than Ur, so that a current can flow through resistors R3 and R2 to the output of amplifier V1. The voltage Ue at the direct input of amplifier V2 is thereby higher than the output voltage Ur of amplifier V1. As soon as the battery voltage Ub also achieves this voltage, amplifier V2 changes its output immediately to 0 volts, so that the silicon controlled rectifier Th is switched off and the fast charging is ended. A low charging current now flows: through light emitting diode L2 and resistor R6 into battery B, serving to maintain the charge. With the circuit in this state, the output voltage Ur of amplifier V1 is greater than the output voltage Ua of amplifier V2, so that a current now flows in the opposite direction through resistors R2 and R3. The input voltage Ue at the direct input of amplifier V2 is thereby lower than the output voltage Ur of amplifier V1. The difference in the different voltages Ue in fast charging and in trickle charging is the hysteresis voltage. Its absolute value can be established within broad parameters through the choice of resistors R2 and R3.

When the battery is removed from the charging circuit, the charging circuit remains in the same state as in trickle charging; that is, the output voltage Ua of amplifier V2 is equal to zero and the silicon controlled rectifier Th is thus nonconducting. Upon reintroducing the battery, the circuit tests whether battery B is in need of charging.

The level of the charging current for fast charging and for trickle charging, which is basically determinable from the internal resistance of the transformer T, is most preferably chosen in such a way that at a ratio of discharge-time to charging-time of about 1:5, battery B can be used as often as desired without exhausting its capacity, where the discharging in each case lasts only a few minutes. Operation of the charger, and with it the charging state of the battery, are indicated by light emitting diodes L1 and L2.

The higher the chosen charging current, the greater the transfer resistances between the poles of the rechargeable battery and the connecting contacts of the charging apparatus. Since in one popular form the nickel-cadmium batteries are lodged in handles with contacts directed outwards, and these handles are then set, for the sake of ease of manageability, to be charged in specially-constructed charging wells with corresponding connections to the actual charging circuit, a large number of contacts arises, all of which are affected by tranfer resistances. The charging current now produces voltage drops at all transfer resistances. These add to the battery voltage, giving the false impression of an elevated battery voltage Ub. In the circuit in FIG. 1 it can therefore occur that a battery is falsely judged to be charged and the fast charging shut off.

Figure 2:
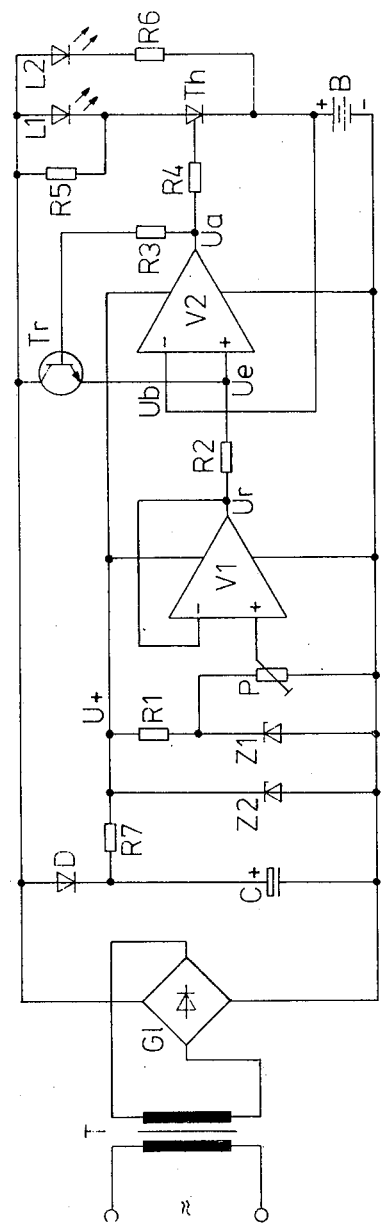
FIG. 2 is the circuit diagram of a second embodiment of the rechargeable battery charging apparatus.

This defect is remedied in a second embodiment of a charging circuit as shown in FIG. 2 by the fact that the base-emitter section of transistor Tr whose collector is connected to the positive terminal of the rectifier G1 is placed into the feedback loop between the output of amplifier V2 and its direct input. This circuit is feasible for a npn-transistor, as shown in FIG. 2; in the case of a correspondingly altered circuit construction a pnp-transistor would have to be used analogously.

In the circuit in FIG. 2 the output voltage Ua of amplifier V2 is once again approximately equal to U+ in the state of fast charging, so that the transistor Tr is turned on. The direct input of amplifier V2 is thereby affected by a voltage which pulses like the charging voltage. Only when the charging voltage is equal or nearly equal to zero (in a network frequency of 60 Hz this is the case 120 times per second) does the voltage have that reference value determined by voltage Ur and the backfeedback over resistor R3 and the base-emitter section of the transistor Tr with which the battery voltage should be compared. Since, however, just at this moment the charging current is equal to zero, the true battery voltage is found at the inverting input of amplifier V2, for comparison. By means of this kind of circuit it is thus achieved that battery B can be charged at a fast rate to its required voltage independent of contact and internal resistances.

In addition, the circuit in FIG. 2 contains one further Zener diode Z2 for preliminary stabilization, for the purpose of raising the stability of the reference voltage. This Zener diode Z2 has one more resistor R7 connected to it.

Both operational amplifiers V1 and V2 can be brought together in a profitable embodiment of the charging circuit in a common-integrated circuit. In a special form of the battery charging apparatus, two charging circuits for two different handles having batteries are lodged independent of one another in a single housing. The reference voltage is here generated only once for both charging circuits, so that altogether three operational amplifiers are necessary which are, however, brought together in a single integrated circuit. The circuits are provided by a transformer having two separate secondaries.

We claim:

1. A charging apparatus for charging a rechargeable battery when placed in contact therewith, comprising: monitoring means for monitoring the voltage of a rechargeable battery when said battery is placed in contact with said charging apparatus, operational amplifier comparing means comprising a positive feedback operational amplifier having an inverting input communicating with said rechargeable battery and a direct input communicating with a source for generating a reference voltage for comparing the monitored battery voltage to a charged reference voltage and a depleted reference voltage, charging means for charging said battery to substantially said charged reference voltage, maintaining means for maintaining said battery at substantially the monitored battery voltage, control means responsive to said comparing means to connect said battery to said charging means when the monitored battery voltage is less than or substantially equal to the depleted reference voltage so as to charge said battery to substantially said charged reference voltage and then connect said battery to said maintaining means until the monitored battery voltage is again less than or substantially equal to said depleted reference voltage, and switching means responsive to the output of said operational amplifier to control said comparing means to be operative in the absence of a charging voltage from said charging means, said switching means comprising a transistor connected between the output of said positive feedback operational amplifier and the direct input of said operational amplifier.

* * * * *